June 5, 1956  U. NISTRI  2,748,615
TRANSMISSIONS OF MOTION BETWEEN DRIVING
AND DRIVEN SHAFTS IN CINEMATIC DEVICES
Filed Nov. 1, 1950
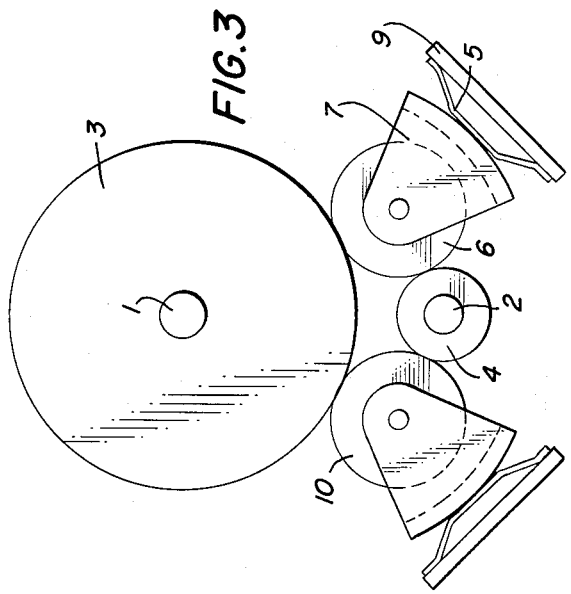
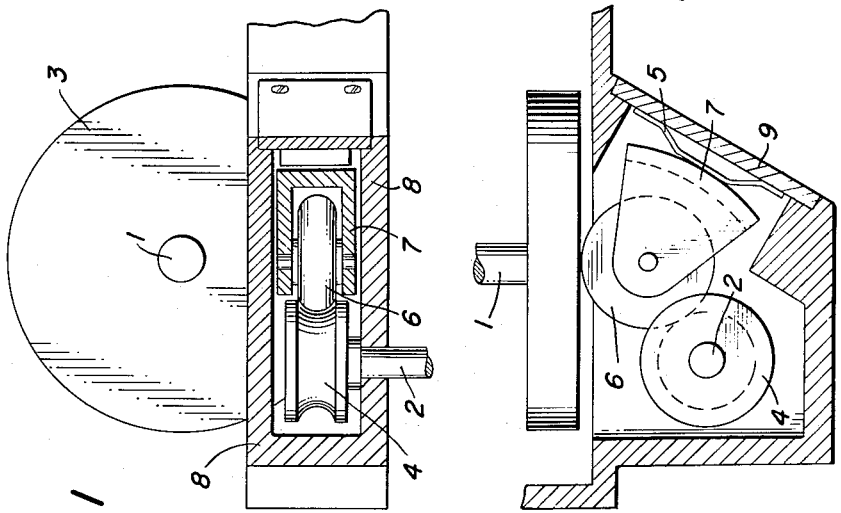
INVENTOR
UMBERTO NISTRI
BY Bertram Ottinger
ATTORNEY United States Patent Office 2,748,615
Patented June 5, 1956

2,748,615

TRANSMISSIONS OF MOTION BETWEEN DRIVING AND DRIVEN SHAFTS IN CINEMATIC DEVICES

Umberto Nistri, Rome, Italy

Application November 1, 1950, Serial No. 193,443

Claims priority, application Italy November 3, 1949

1 Claim. (Cl. 74—209)

In cinematic devices in general, where the need of low cost and easy maintenance are joined with the need for silence, the transmission of motion between shafts turning at a very high number of revolutions is a very serious problem.

In fact, transmissions through gearing are noisy and require particular care in lubrication in order to prevent rapid wear of the gears, while transmissions by belting have the well-known faults of being subject to breakage of the belts and, in general, of having lack of uniformity in the driven shafts when the belt is not sufficiently tight or has some defect.

The object of the present invention is to replace the gear or belt by a transmission system which will temporarily cause an effect of friction, be easily replaceable and be silent without any of the faults mentioned above.

The device in question is indicated in the two views, Figures 1 and 2. Shaft 1 is the driven shaft, and shaft 2 is the driving shaft.

A disc 3 is attached to shaft 1 and this disc may also be the flywheel of the cinematic system. A roller 4, also of metal, is attached to shaft 2. In the type of construction indicated in Figs. 1 and 2, the shafts 1 and 2 are arranged at 90° to each other.

A disc 6 is pressed against roller 4 and the surface of disc 3 by means of a spring 5. The periphery of this disc 6 is covered with rubber or any other material suitable for the purpose. Support 7 of disc 6 is held in place by two planes 8 which are parallel to each other and are at right angles to shaft 2, and which permit disc 6 to move in both directions in their plane so that spring 5 may freely press disc 6 against its limiting stops, in other words, against disc 3 and roller 4, with its pressure equally distributed between the two.

When shaft 2 rotates, disc 6 transmits its rotation to disc 3 in the ratio existing between the diameter of roller 4 and the distance between the center of shaft 1 and the point of contact between disc 6 and disc 3.

In order to replace disc 6, it is sufficient merely to remove plate 9 which is the plate which obliges the spring 5 to press against support 7 of disc 6. This support can then be replaced with another support equipped with another disc.

A variation in the system is indicated in Fig. 3, in which shafts 1 and 2 are parallel to each other and disc 6 is pressed against the periphery of discs 3 and 4.

A second disc, 10, operating in the same manner as above, can be arranged on the opposite side in order to balance the thrust of the spring against the rotating shafts.

What I claim is:

A kinematic transmission between a driving shaft and a driven shaft both of which have discs thereon, said transmission comprising a satellite disc having a traction periphery engaging the disc on the driven shaft and the disc on the driving shaft, a support rotatably mounting said satellite disc, a housing for the satellite disc and support, said housing including a pair of walls having spaced parallel inner surfaces lying in planes perpendicular to the axis of rotation of the satellite disc, said support having opposite side surfaces thereof slidably engaging said inner wall surfaces to mount said support for two-dimensional freedom of movement in said housing in a plane perpendicular to the axis of rotation of the satellite disc, a member bridging the space between the two parallel spaced inner surfaces, and means to urge said support toward the discs on said driving and driven shafts, said means comprising a spring under compression between said member and the support whereby by removing said member the support and the satellite disc can be removed for replacement.

References Cited in the file of this patent

UNITED STATES PATENTS

| Re. 23,123 | Schneider | June 14, 1949 |
| 297,407 | Jenkin | Apr. 22, 1884 |
| 632,421 | Moskowitz | Sept. 5, 1899 |
| 1,300,169 | Hudson | Apr. 8, 1919 |
| 2,019,006 | Ferrari | Oct. 29, 1935 |
| 2,161,148 | Erwood | June 6, 1939 |
| 2,165,580 | Scheufler | July 11, 1939 |
| 2,421,910 | Hartman | June 10, 1947 |

FOREIGN PATENTS

| 3,684 of 1896 | Great Britain | Jan. 9, 1897 |